US010839860B2

(12) United States Patent
Zhang et al.

(10) Patent No.: US 10,839,860 B2
(45) Date of Patent: Nov. 17, 2020

(54) METHODS AND DEVICES FOR REDUCING CONDENSATION IN STORAGE DEVICES (71) Applicant: Seagate Technology LLC, Cupertino, CA (US)

(72) Inventors: Li Hong Zhang, Singapore (SG); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/384,198

(22) Filed: Apr. 15, 2019

(65) Prior Publication Data

US 2020/0327911 A1 Oct. 15, 2020

(51) Int. Cl.
*G11B 33/14* (2006.01)
*G11B 5/10* (2006.01)
*G11B 33/02* (2006.01)
*C08L 27/18* (2006.01)
*C09D 127/18* (2006.01)
*G11B 5/255* (2006.01)
*G11B 5/55* (2006.01)
*G11B 33/12* (2006.01)

(52) U.S. Cl.
CPC .......... *G11B 33/1453* (2013.01); *C08L 27/18* (2013.01); *C09D 127/18* (2013.01); *G11B 5/102* (2013.01); *G11B 5/255* (2013.01); *G11B 5/5521* (2013.01); *G11B 33/022* (2013.01); *G11B 33/121* (2013.01)

(58) Field of Classification Search
CPC .. G11B 33/1453; G11B 33/14; G11B 33/1446
USPC .................. 360/97.12, 99.16, 99.18
See application file for complete search history.

(56) References Cited

U.S. PATENT DOCUMENTS

| 4,684,510 | A | 8/1987 | Harkins |
| 5,768,056 | A | 6/1998 | Boutaghou et al. |
| 7,244,521 | B2 | 7/2007 | Liu et al. |
| 8,159,778 | B2 | 4/2012 | Gao et al. |
| 9,147,633 | B2 | 9/2015 | Eid et al. |
| 10,017,384 | B1* | 7/2018 | Greer ................ H01L 31/02363 |
| 2007/0166464 | A1* | 7/2007 | Acatay ................ D01D 5/0007 |
| | | | 427/346 |

(Continued)

FOREIGN PATENT DOCUMENTS

CN 108310807 A * 7/2018
GB 2415406 * 12/2005

OTHER PUBLICATIONS

A Bisetto et al. "Dropwise condensation on superhydrophobic nanostructured surfaces: literature review and experimental analysis". 31st UIT (Italian Union of Thermo-fluid-dynamics) Heat Transfer Conference 2013. Journal of Physics: Conference Series 501 (2014) 012028. 10 pages.

(Continued)

*Primary Examiner* — Jefferson A Evans
(74) *Attorney, Agent, or Firm* — Faegre Drinker Biddle & Reath (57) ABSTRACT A hard disk drive includes a cover coupled to a base deck to create an enclosure. The hard disk drive further includes data-recording components and non-data-recording components positioned within the enclosure. At least one of the non-data-recording components includes a surface with a surface treatment that promotes condensation of water vapor.

19 Claims, 6 Drawing Sheets

(56) References Cited

U.S. PATENT DOCUMENTS

| | | | |
|---|---|---|---|
| 2008/0013207 A1* | 1/2008 | Feliss | G11B 5/6005 |
| | | | 360/97.14 |
| 2009/0148348 A1 | 6/2009 | Pettigrew et al. | |
| 2010/0178422 A1* | 7/2010 | Deeken | G11B 25/043 |
| | | | 427/203 |
| 2010/0214732 A1* | 8/2010 | Charles | H05K 5/061 |
| | | | 361/679.33 |
| 2010/0254040 A1* | 10/2010 | Gao | G11B 33/1446 |
| | | | 360/97.12 |
| 2012/0171419 A1* | 7/2012 | Russell | B08B 17/06 |
| | | | 428/141 |
| 2013/0148239 A1* | 6/2013 | Lee | G11B 33/146 |
| | | | 360/97.18 |
| 2015/0035204 A1* | 2/2015 | Stoner | C09J 7/048 |
| | | | 264/334 |
| 2015/0147523 A1* | 5/2015 | Kumar | C23C 16/0254 |
| | | | 428/141 |
| 2016/0148631 A1 | 5/2016 | Li et al. | |
| 2017/0190139 A1* | 7/2017 | Haghdoost | B32B 15/20 |
| 2018/0126703 A1* | 5/2018 | Kobilka | B32B 15/16 |
| 2019/0080724 A1* | 3/2019 | Zhang | B01D 46/0031 |
| 2019/0284447 A1* | 9/2019 | Furuta | C09J 133/10 |
| 2019/0351450 A1* | 11/2019 | Yoshida | C09D 175/04 |

OTHER PUBLICATIONS

R. Parin et al. "Dropwise condensation over superhydrophobic aluminum surfaces". 7th European Thermal-Sciences Conference. Journal of Physics: Conference Series 745 (2016) 032134. 8 pages.

\* cited by examiner

METHODS AND DEVICES FOR REDUCING CONDENSATION IN STORAGE DEVICES

SUMMARY

In certain embodiments, a hard disk drive includes a cover coupled to a base deck to create an enclosure. The hard disk drive further includes data-recording components and non-data-recording components positioned within the enclosure. At least one of the non-data-recording components includes a surface with a surface treatment that promotes condensation of water vapor.

In certain embodiments, a method for making a hard disk drive is disclosed. The hard disk drive includes data-recording components and non-data-recording components. The method includes texturing a surface of a non-data-recording component to create a textured surface. The method further includes applying a hydrophobic coating to the textured surface.

In certain embodiments, a method for making a hydrophobic film is disclosed. The method includes texturing a first surface of a metal foil layer of the hydrophobic film to create a textured surface. The method further includes applying a hydrophobic coating to the textured surface and applying an adhesive to a second surface of the metal foil layer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Changes in the environment external to hard disk drives can cause water vapor within hard disk drives to condense. Condensed water vapor that gets deposited on magnetic recording media can damage the media and can interfere with the interface between the media and read/write heads, causing hard disk drive errors or failures. Certain embodiments of the present disclosure are accordingly directed to methods and devices for mitigating the risk of water condensation on the magnetic recording media.

Figure 1:
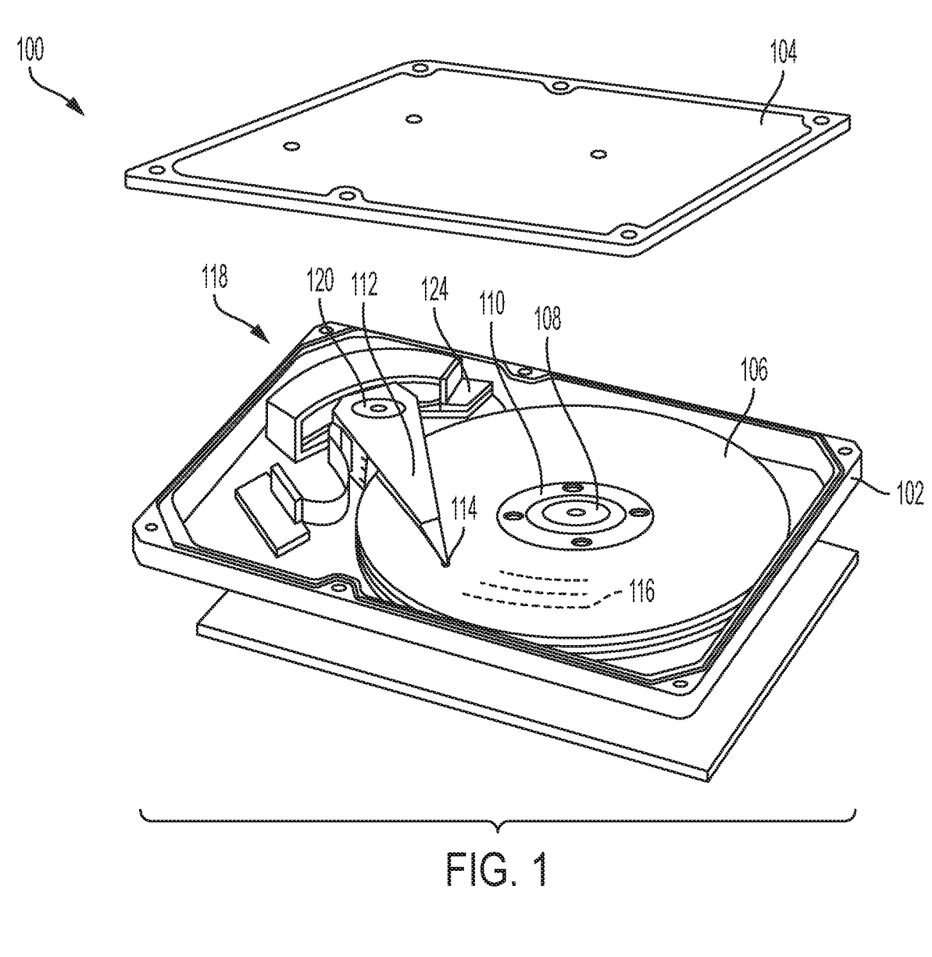
FIG. 1 shows an exploded, perspective view of a hard disk drive, in accordance with certain embodiments of the present disclosure.
Figure 2:
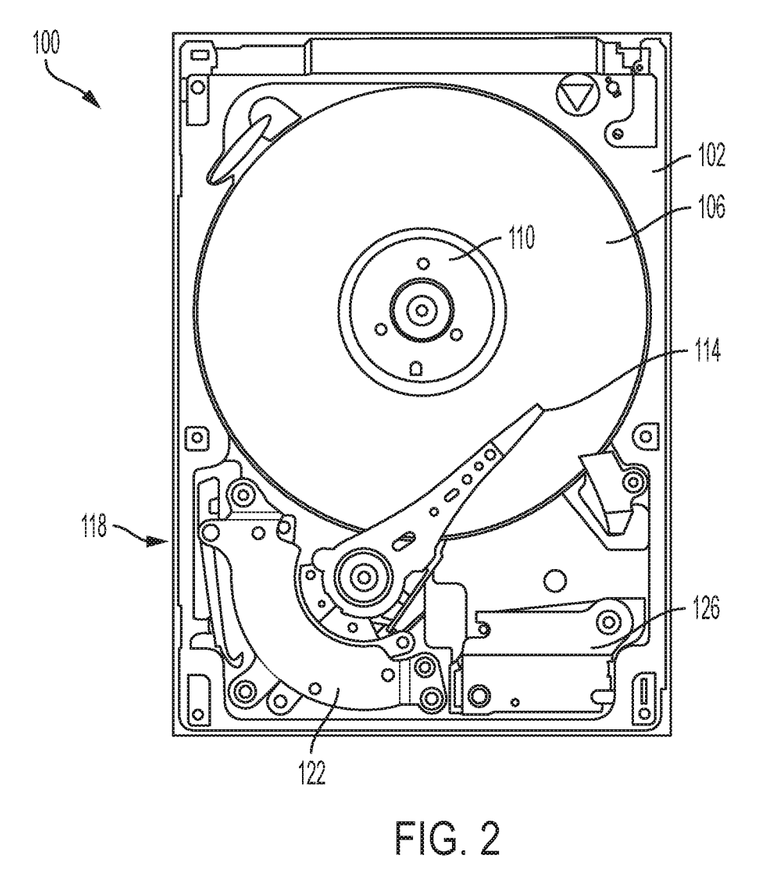
FIG. 2 shows a top view of the hard disk drive of FIG. 1, in accordance with certain embodiments of the present disclosure.

FIG. 1 shows an exploded, perspective view of a hard disk drive 100 having a base deck 102 and a top cover 104 that creates an enclosure that houses various components of the hard disk drive 100. FIG. 2 shows a top view of the hard disk drive 100. The hard disk drive 100 includes magnetic recording media 106 (individually referred to as a magnetic recording medium) coupled to a spindle motor 108 by a disk clamp 110. The hard disk drive 100 also includes an actuator assembly 112 that positions read/write heads 114 over data tracks 116 on the magnetic recording media 106. During operation, the spindle motor 108 rotates the magnetic recording media 106 while the actuator assembly 112 is driven by a voice coil motor assembly 118 to pivot around a pivot bearing 120. The read/write heads 114 write data to the magnetic recording media 106 by generating and emitting a magnetic field towards the magnetic recording media 106 which induces magnetically polarized transitions on the desired data track 116. The magnetically polarized transitions are representative of the data. The read/write heads 114 sense (or "read") the magnetically polarized transitions with a magnetic transducer. As the magnetic recording media 106 rotates adjacent the read/write heads 114, the magnetically polarized transitions induce a varying magnetic field into a magnetic transducer of the read/write heads 114. The magnetic transducer converts the varying magnetic field into a read signal that is delivered to a preamplifier and then to a read channel for processing. The read channel converts the read signal into a digital signal that is processed and then provided to a host system (e.g., server, laptop computer, desktop computer).

As mentioned above, changes in the environment external to hard disk drives can cause water vapor within hard disk drives to condense. For example, water vapor will condense when the internal temperature of hard disk drives falls to a temperature below water vapor saturation pressure. The condensed water vapor will deposit on various surfaces within hard disk drives. Condensed water vapor is more likely to deposit on the magnetic recording media 106 because of the materials applied to the surface of the magnetic recording media 106. The magnetic recording media 106 are typically coated with a perfluoro-polyether lubricant, which is hydrophobic and therefore promotes condensation of water vapor. The rate of condensation of water vapor is higher on a hydrophobic material—which promotes drop-like condensation—than that on a hydrophilic material—which promotes film-like condensation. Condensed water vapor on the magnetic recording media 106 can interfere with read/write heads' ability to write to the magnetic recording media 106.

In certain embodiments, one or more surfaces are treated (e.g., a surface treatment) to promote water vapor condensation on such surfaces as opposed to the surfaces of the magnetic recording media 106. For example, as will be explained in more detail below, surfaces of non-data-recording components (e.g., the base deck 102, the top cover 104, the voice coil motor assembly 118, electrical connectors) can include a surface treatment, such as being textured and/or treated with a hydrophobic coating, to promote water vapor condensation on such surfaces instead of data-recording components (e.g., the magnetic recording media 106 and the read/write heads 114). As another example, surfaces of non-data-recording components can be at least partially covered by an adhesive-backed film that is textured and/or treated with a hydrophobic coating to promote water vapor condensation on such surfaces instead of on the data-recording components.

Figure 3A:
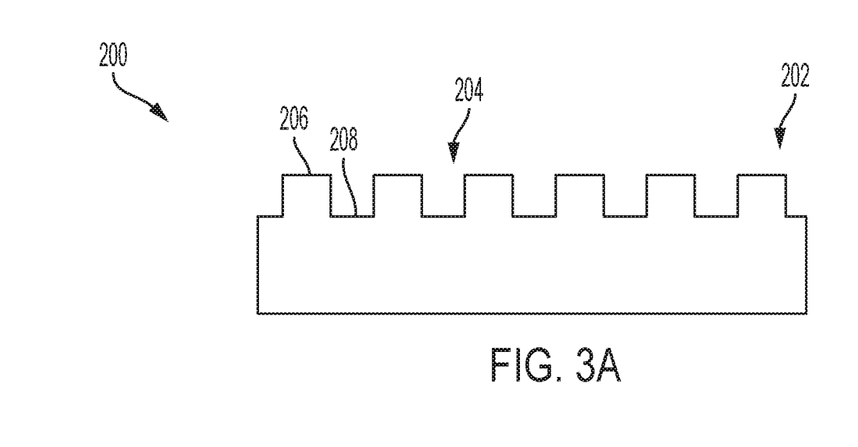
FIGS. 3A and 3B show schematic sectional views of a surface of one or more components of the hard disk drive of FIGS. 1 and 2, in accordance with certain embodiments of the present disclosure.
Figure 3B:
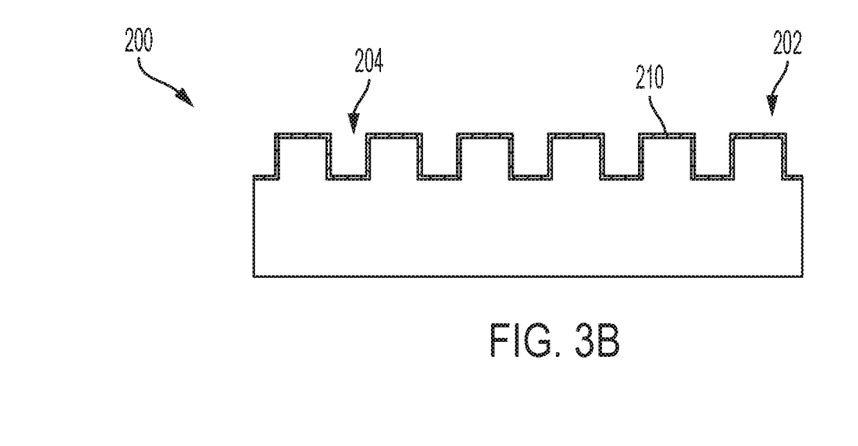
Figure 4:
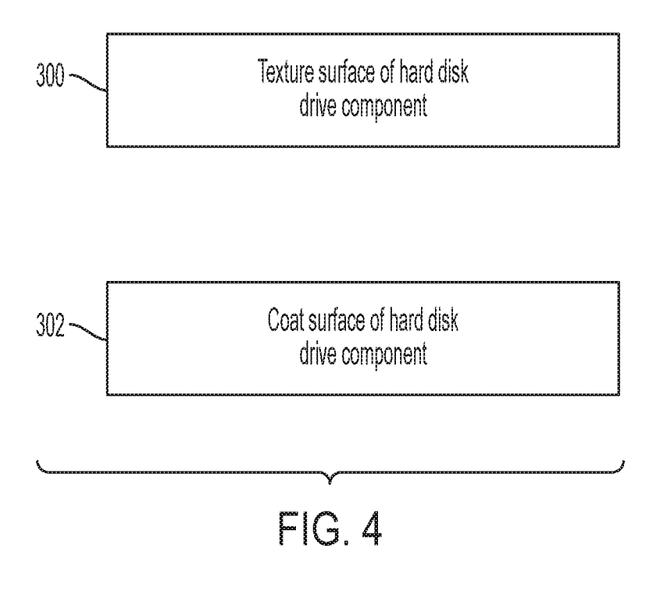
FIG. 4 shows a block diagram of various steps of a method, in accordance with certain embodiments of the present disclosure.

FIGS. 3A and 3B show schematic sectional views of treated surfaces that can be incorporated into one or more components of the hard disk drive 100. FIG. 4 shows a block diagram representing steps that can be used to treat the surface shown in FIGS. 3A and 3B.

FIG. 3A features a component 200 (e.g., a non-data-recording component) of the hard disk drive 100 with a surface 202 that is textured. The surface 202 includes notches 204 (e.g., islands or grooves) formed by peaks 206 and valleys 208. The notches 204 can have depths in nanometer to micrometer ranges of depths. The notches 204 can form uniform or irregular patterns. For example, the notches 204 can have substantially uniform depths and/or widths. Although the notches 204 are shown as being square-shaped, the notches 204 can be formed by other shapes (e.g., v-shaped notches, u-shaped notches), which may be a function of the technique used to create the notches 204. The notches 204 can be created using various techniques for texturing surfaces (block 300 in FIG. 4). For example, if the component 200 comprises a metal surface, the notches 204 can be created via plating, photolithography, laser/plasma processes, chemical etching, chemical deposition, electrochemical deposition, anodic oxidation, and the like.

Independently, or in addition to texturing the surface 202 of the component 200, the surface 202 can be treated with a coating 210 (block 302 in FIG. 4). The coating 210, shown in FIG. 3B, can comprise a material such as a hydrophobic material. As mentioned above, hydrophobic materials cause water vapor to condense at rates higher than hydrophilic materials. This is due to the hydrophobic surface created by a combination of a low surface energy coating and surface texturing—which promotes drop-like condensation of water vapor as opposed to film-like condensation. Drop-like condensation on a hydrophobic surface enhances heat transfer and mass transfer coefficients. As such, the condensation rate is higher than film-like condensation, which forms on a hydrophilic surface. Thus, in the event water vapor reaches or exceeds the saturated vapor pressure, applying a hydrophobic coating to the surface 202 of the component 200 will facilitate water condensation to the surface 202 to condense on the surface 202 away from the magnetic recording media 106 in the hard disk drive 100. In certain embodiments, the coating 210 is 5-60 nanometers thick.

In certain embodiments, the hydrophobic coatings include but are not limited to fluorinated monomers and fluorinated polymers. Example hydrophobic coatings include 1H,1H, 2H,2H-Perfluoro-octyl-trimethoxysilane, 2-(difluoromethoxymethyl)-1,1,1,2,3,3,3-heptafluoropropane, 4-methoxy-1,1,1,2,2,3,3,4,4-nona-fluorobutan, PEDOT-F-4 or PEDOT-H-8, 1H,1H,2H,2H-perfluoro-decyltriethoxysilane, 1H,1H,2H,2H-perfluorooctyl-trichlorosilane, teflon, and the like. The coating 210 can be applied to the surface 202 (e.g., after the surface 202 has been textured) using methods such as chemical vapor deposition, physical vapor deposition, dip coating, and the like. In certain embodiments, the surface 202 is cleaned (e.g., via ultrasonic cleaning or plasma etching) before the coating 210 is applied to the surface 202.

In embodiments with a textured surface, the coating 210 will substantially conform to the shape of the notches 204. Further, the coating 210 can cover all or only a portion of the notches 204 on the surface 202. Further, the coating 210 can be applied to portions of components of the hard disk drive 100 that are not textured such that the coating 210 covers textured and/or non-textured portions of the component.

In certain embodiments, the combination of the textured surface and the hydrophobic coating creates a hydrophobic surface with a lower surface energy relative to the hydrophobic surface of the magnetic recording media 106. As such, the hydrophobic surface of the non-data-recording components promotes condensation of water vapor at a faster rate than that of the data-recording components. Thus, the surface treatment on the non-data-recording components can "attract" water vapor condensation away from the data-recording components and mitigate the risk of errors or failures caused by water deposited on the magnetic recording media 106.

Figure 5:
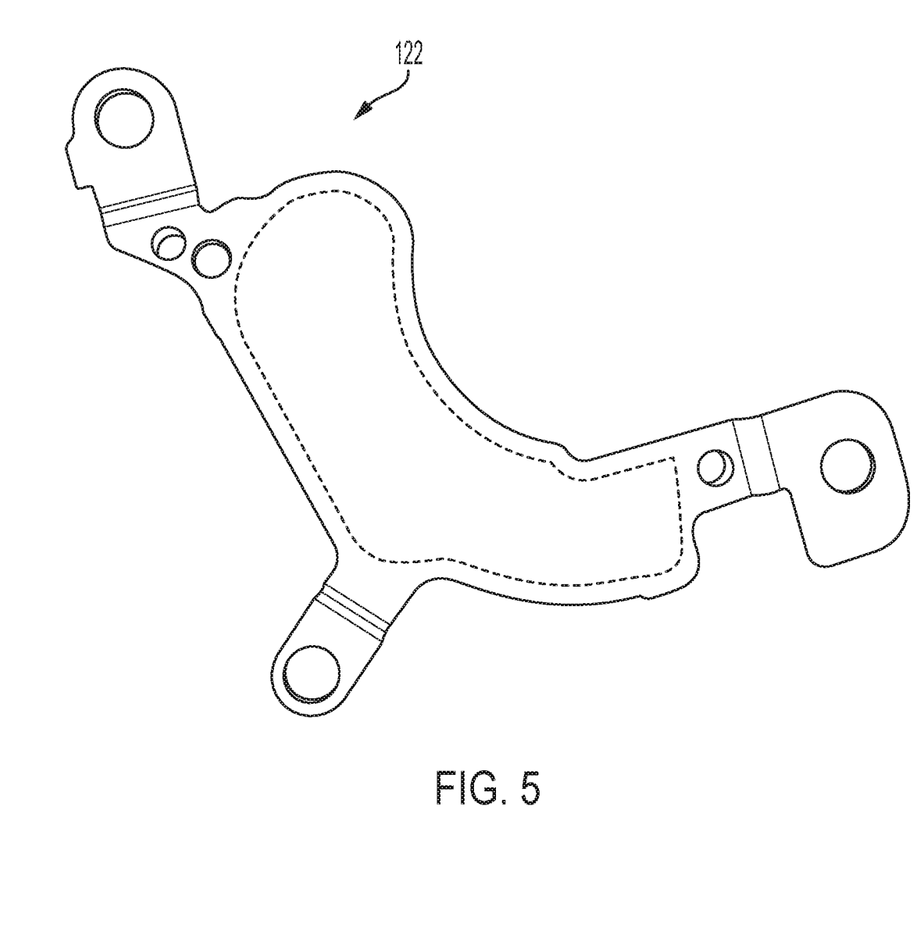
FIG. 5 shows a component of a voice coil motor assembly of the hard disk drive of FIGS. 1 and 2, in accordance with certain embodiments of the present disclosure.

FIG. 5 shows one example component from the hard disk drive 100 that can be textured and/or coated with a hydrophobic coating. FIG. 5 shows a top pole plate 122 of the voice coil motor assembly 118. The top pole plate 122 has a relatively large surface area compared to other components of the hard disk drive 100. Further, the top pole plate 122 is positioned away from the magnetic recording media 106 such that water vapor that condenses on the top pole plate 122 is less likely to be ultimately transferred to the magnetic recording media 106 (e.g., via airflow in the hard disk drive 100). All or a portion of the top pole plate 122 can be textured and/or coated. For example, FIG. 5 shows only a portion (boundary represented by dotted lines) of the top pole plate 122 being textured and/or treated with a coating.

The top pole plate 122 is just one example of a non-data-recording component of the hard disk drive 100 that can be textured and/or treated with a coating to create a hydrophobic surface. Other components include, but are not limited to, a lower pole plate 124 (shown in FIG. 1) of the voice coil motor assembly 118, an electrical connector pad 126 (e.g., a J1 connector pad) (shown in FIG. 2), portions of the base deck 102 (e.g., surfaces of the bottom plate and/or sidewalls), and portions of the top cover 104. Further, more than one component in the hard disk drive 100 can be textured and/or treated with a coating.

Figure 6:
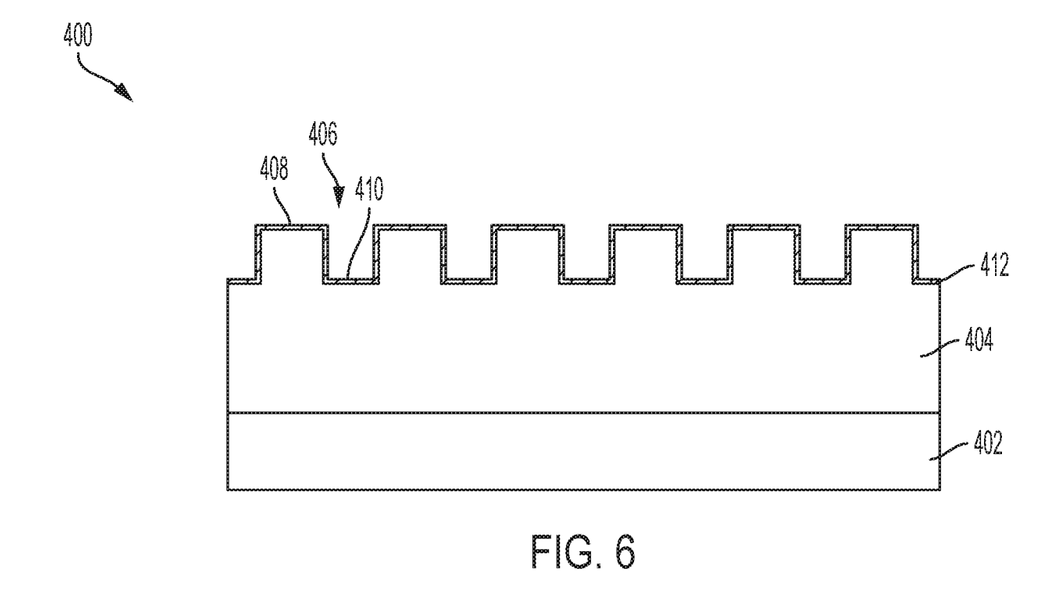
FIG. 6 shows a schematic sectional view of an adhesive-backed film, in accordance with certain embodiments of the present disclosure.

FIG. 6 shows schematic sectional views of a film 400 that can be applied to one or more surfaces of components (e.g., non-data-recording components) of the hard disk drive 100. The film 400 includes a hydrophobic surface, which promotes water vapor condensation such that water vapor is drawn away from surfaces of data-recording components.

The film 400 can include multiple layers such as an adhesive layer 402 and a metal layer 404 to form a multi-layer, tape-like film. The film 400 can be thin and cut into different shapes to conform to space restraints of the hard disk drive 100 and its components. The metal layer 404 can be adhered to a component via the adhesive layer 402. For example, instead of, or in addition to, providing a surface treatment to non-data recording components as described above, the film 400 can be applied to non-data-recording components. In certain embodiments, the film 400 is applied to components with surface geometries and/or components that are more challenging to treat via texturing or coating with a hydrophobic coating while surfaces of other components are treated themselves.

The metal layer 404 can be textured and/or treated with a hydrophobic coating to attract condensed water vapor away from the surfaces of data-recording components. In certain embodiments, the metal layer 404 comprises a metal foil (e.g., a stainless steel foil) that is processed to include notches 406 on one of its surfaces. The notches 406 can be formed by peaks 408 and valleys 410. The notches 406 can have depths in nanometer to micrometer ranges of depths. The notches 406 can form uniform or irregular patterns. For example, the notches 406 can have substantially uniform depths and/or widths. Although the notches 406 are shown as being square-shaped, the notches 406 can be other shapes (e.g., v-shaped notches, u-shaped notches), which may depend on the technique used to create the notches 406. The notches 406 can be created using various techniques for texturing surfaces such as plating, photolithography, laser/plasma processes, chemical etching, chemical deposition, electrochemical deposition, anodic oxidation, and the like.

Independently, or in addition to texturing the metal layer 404, the metal layer 404 can be treated with a coating 412. The coating 412 can comprise a material such as a hydrophobic material to promote water vapor to condense in a drop-like form on the film 400 rather than the magnetic recording media 106 in the hard disk drive 100. In certain embodiments, the hydrophobic coating includes but are not limited to fluorinated monomers and fluorinated polymers. Example hydrophobic coatings include 1H,1H,2H,2H-Perfluoro-octyl-trimethoxysilane, 2-(difluoromethoxymethyl)-1,1,1,2,3,3,3-heptafluoropropane, 4-methoxy-1,1,1,2,2,3,3,4,4-nona-fluorobutan, PEDOT-F-4 or PEDOT-H-8, 1H,1H,2H,2H-perfluoro-decyltriethoxysilane, 1H,1H,2H,2H-perfluorooctyl-trichlorosilane, teflon, and the like. The coating 412 can be applied to the metal layer 404 (e.g., after the metal layer 404 has been textured) using methods such as chemical vapor deposition, physical vapor deposition, dip coating, and the like. In certain embodiments, the metal layer 404 is cleaned (e.g., via ultrasonic cleaning or plasma cleaning) before the coating 412 is applied to the metal layer 404. The coating 412 can substantially conform to the shape of the notches 406. In certain embodiments, the coating 412 is 5-60 nanometers thick. Further, the coating 412 can cover all or only a portion of the notches 406 on the metal layer 404.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
a base deck;
a cover coupled to the base deck to create an enclosure;
data-recording components positioned within the enclosure and including a magnetic recording medium having a first hydrophobic surface; and
non-data-recording components positioned within the enclosure, at least one of the non-data-recording components including a second hydrophobic surface with a surface treatment that promotes condensation of water vapor, the second hydrophobic surface having a lower surface energy than the first hydrophobic surface.

2. The hard disk drive of claim 1, wherein the data-recording components include a read/write head.

3. The hard disk drive of claim 1, wherein the non-data-recording components include a voice coil motor assembly.

4. The hard disk drive of claim 1, wherein the surface treatment includes a textured surface.

5. The hard disk drive of claim 4, wherein the textured surface comprises notches.

6. The hard disk drive of claim 4, wherein the textured surface is coated with a hydrophobic material.

7. The hard disk drive of claim 1, wherein the surface treatment includes a coating on the surface.

8. The hard disk drive of claim 7, wherein the coating comprises a hydrophobic material.

9. The hard disk drive of claim 8, wherein the hydrophobic material comprises a fluorinated monomer.

10. The hard disk drive of claim 7, wherein the coating is 5-60 nanometers thick.

11. The hard disk drive of claim 1, wherein the surface treatment includes an adhesive-backed film with a textured surface.

12. The hard disk drive of claim 11, wherein the adhesive-backed film includes a metal layer having the textured surface.

13. The hard disk drive of claim 11, wherein the adhesive-backed film is adhered to at least one of the non-data-recording components.

14. The hard disk drive of claim 11, wherein the textured surface is coated with a material.

15. The hard disk drive of claim 14, wherein the material comprises a hydrophobic material.

16. The hard disk drive of claim 14, wherein the material is 5-60 nanometers thick.

17. A method for providing a non-data-recording disk drive component with a hydrophobic film, the method comprising:
texturing a first surface of a metal foil layer of the hydrophobic film to create a textured surface;
applying a hydrophobic coating to the textured surface;
applying an adhesive to a second surface of the metal foil layer; and
attaching the metal foil layer to the non-data-recording disk drive component.

18. A hard disk drive comprising:
a base deck;
a cover coupled to the base deck to create an enclosure;
data-recording components positioned within the enclosure; and
non-data-recording components positioned within the enclosure, at least one of the non-data-recording components coupled to an adhesive-backed film with a textured surface that is coated with a hydrophobic material.

19. The hard disk drive of claim 18, wherein the adhesive-backed film includes a metal layer having the textured surface.

* * * * *